United States Patent [19]
Hecken

[11] 3,980,973
[45] Sept. 14, 1976

[54] LINE DEVICE FOR TRANSMISSION LINES HAVING COAXIAL CABLES FOR THE TRANSMISSION OF DIGITAL OR ANALOG SIGNALS

[75] Inventor: Rudolf P. Hecken, Andover, Mass.

[73] Assignee: Siemens Aktiengesellschaft, Berlin & Munich, Germany

[22] Filed: May 5, 1975

[21] Appl. No.: 574,649

[30] Foreign Application Priority Data

May 6, 1974 Germany............................ 2421784

[52] U.S. Cl. ............................ 333/28 R; 178/69 R; 178/70 R; 179/170 J; 333/84 M
[51] Int. Cl.² ....................... H04B 3/14; H03H 7/14
[58] Field of Search................. 333/28 R; 325/1, 13, 325/42, 65; 178/69 R, 70 R; 179/170 J

[56] References Cited
UNITED STATES PATENTS

| | | | |
|---|---|---|---|
| 3,268,836 | 8/1966 | Linke................................ | 333/28 X |
| 3,491,298 | 1/1970 | DeJager et al........................ | 325/13 |

*Primary Examiner*—Paul L. Gensler
*Attorney, Agent, or Firm*—Hill, Gross, Simpson, Van Santen, Steadman, Chiara & Simpson

[57] ABSTRACT

A line device for transmission lines having coaxial cables for the transmission of signals, in particular digital signals or analog signals, employs an input equalizer in the form of a line section connected in parallel or in series to the transmission path, a first switch or dividing network for dividing the transmission path into a communications transmission path and a long distance current supply path, a regenerator in the communication transmission path, a series circuit connected in the long distance supply path including a first low pass filter, an element for producing a voltage drop for the current supply of the regenerator and a second low pass filter. A second switch or dividing network rejoins the communications and long distance supply paths and an output equalizer in the form of an additional line section is connected in parallel to the transmission path or in series with the transmission path. The line sections have at least two sub-sections of different wave resistances and at least one of the sections is adjustable during the manufacturing process in respect of its wave resistance. A terminating resistance is provided for each line section.

27 Claims, 13 Drawing Figures

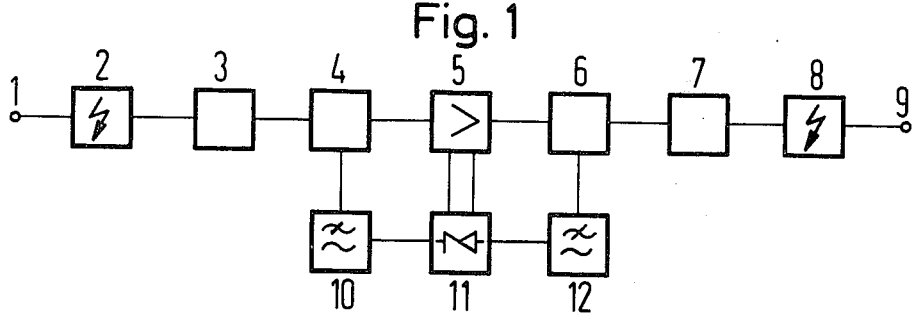
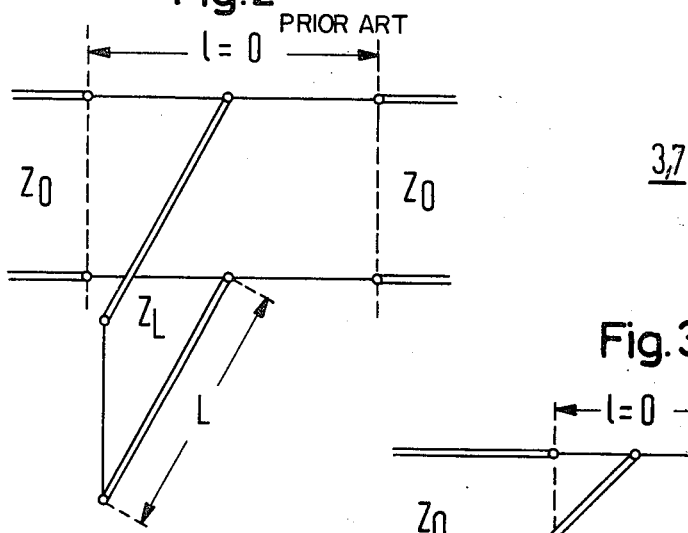
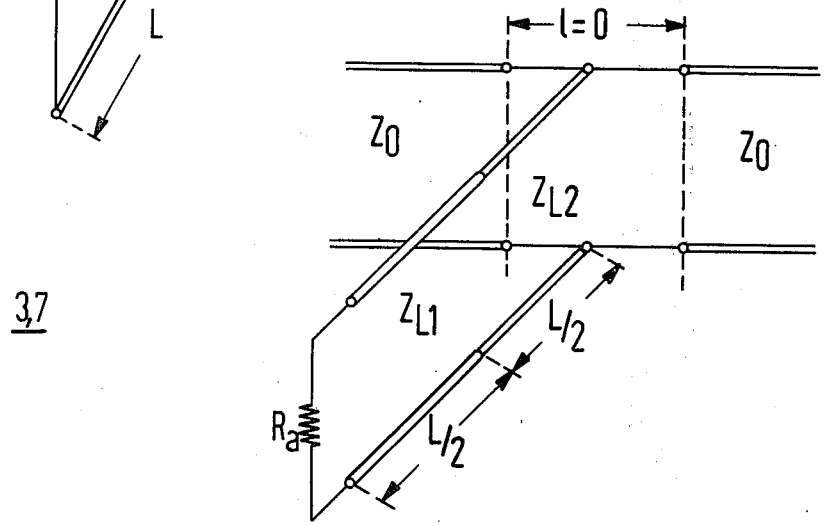

LINE DEVICE FOR TRANSMISSION LINES HAVING COAXIAL CABLES FOR THE TRANSMISSION OF DIGITAL OR ANALOG SIGNALS

BACKGROUND OF THE INVENTION

1. Field of the Invention

This invention relates to a line device for transmission lines having coaxial cables for the transmission of digital signals, and for the transmission of analog signals, in which an input equalizer is provided in the form of a line section connected in parallel or in series with respect to the transmission path. A dividing network separates the transmission path into a communications path and a long distance current supply path. A regenerator is located in the communications transmission path and a chain circuit is located in the long distance current supply path. The chain circuit comprises a first low pass filter, an element for producing a voltage drop for the current supply of the regenerator and a second low pass filter. A second dividing network reunites the communications and long distance supply paths and an output equalizer in the form of a further line section is connected in parallel or in series with respect to the transmission path. The invention is more particularly concerned with the simplification of the structure of such line devices and with techniques for providing such a line device in which there is a simple adjustment of the equalizers to different cable lengths.

2. Description of the Prior Art

Line devices, as generally described above, are known from the publication "Nachrichtentechnischen Fachberichten" (Communications Technical Reports), Vol. 42, 1972-PCM-Technik-VDE Publishing House GmbH, Berlin-Charlottenburg, Pages 170 to 188.

It is also known from the German Offenlegungsschrift 1,923,102 that the line sections in such antidistortion devices may be terminated not only by a short circuit, but also with any desired complex resistance.

The length of the line section employed is dimensioned in such a way that the attenuation caused by a certain cable length is equalized to an optimum with the respect to the frequency.

SUMMARY OF THE INVENTION

It is the primary object of the invention to realize a line device with which a simple adjustment of the antidistortion devices for different cable lengths is possible.

In the case of a line device of the type generally mentioned above, this objective is achieved, according to the invention, in that line sections are provided which have at least two sub-sections of different wave resistances, at least one of the sub-sections being adjustable in respect of its wave resistance during production, and that terminating resistances are provided at the line sections.

It is advantageous for a practical execution of the invention if a single-layer circuit constructed in printed circuit technique, in thin film technique or in thick film technique is provided as a line section, and it is advantageous that the outer conductor is arranged on both sides of the inner conductor, or that a printed inner conductor with a housing as an outer conductor surrounding the inner conductor is provided as a line section.

For space saving reasons, at least the inner conductor of the line sections may be curved or bent either once or several times so that the actual distance between its ends is shorter than its electrical length.

It is also advantageous to construct the terminating resistance in printed circuit technique, in thin film technique or thick film technique, or to construct the terminating resistance as a separate chip.

Moreover, it is advantageous if at least one capacitor is provided and connected in series with the terminating resistance to fulfill the function of a dividing network, which capacitor may be designed in the form of an individual element.

It is also advantageous if the inner conductors of the line sections form parts of and are included in the long distance current supply transmission path.

In order to obtain an overvoltage protection, it is advantageous to provide a gas-filled voltage arrester which is connected in parallel to the terminating resistance or in parallel to the series connection of a terminating resistor and a dividing capacitor. For the same purpose, it is also advantageous to provide a voltage dependent resistance as a terminating resistance.

An advantageous structure results if a circuit board is provided, whereby the low pass filters and the element for producing the voltage drop are located between the inner conductors of the line sections of the input and output equalizers and within at least one of the outer conductors extending from one line section to the other.

In the case of this latter arrangement, in which the outer conductors may be in the form of a housing, shielding walls are provided to advantage between the line sections and their terminating resistances and low pass filters.

The line devices according to the invention may be designed in an advantageous manner also as two or three layer printed circuit board structures, whereby the terminating resistances and the capacitors may form intermediate layers.

Terminals to which the coaxial cables are soldered are provided in an advantageous manner at the inputs of both line sections.

The line device may be employed also for the transmission of analog signals, whereby an amplifier is arranged in the communications transmission path.

It is also possible to construct the antidistortion devices in the form of a line section which is connected in parallel and in the form of a line section which is connected in series.

BRIEF DESCRIPTION OF THE DRAWINGS

Other objects, features and advantages of the invention, its organization, construction and mode of operation will be best understood from the following detailed description taken in conjunction with the accompanying drawings, on which:

FIG. 1 is a block diagram of a line regenerator;

FIG. 2 is an equivalent circuit diagram of a known input and output equalizer;

FIG. 3 is an equivalent circuit of an exemplary embodiment of input and output equalizers according to the invention;

DESCRIPTION OF THE PREFERRED EMBODIMENTS

Figure 4:
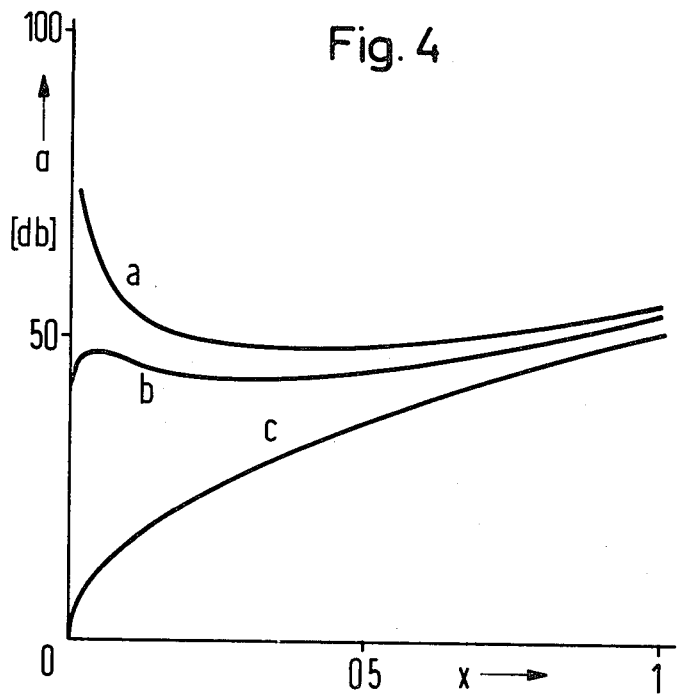
FIG. 4 is a graphical illustration of attenuation with respect to frequency for a series connection of an equalizer, cable and another equalizer.

FIG. 1 illustrates a line regenerator circuit in block form having an input 1, a first over voltage protection device 2, an input equalizer 3 (antidistortion device), a first switching or dividing network 4, a regenerator or amplifier 5, a second switch or dividing network 6, an output equalizer 7, a second overvoltage protection circuit 8, an output 9, a first low pass filter 10, an element for producing a voltage drop 11 and a second low pass filter 12.

Distorted analog or digital signals are applied to the input 1 by the preceding transmission cable. These signals are preequalized in the input equalizer 3, amplified or regenerated in the amplifier or regenerator 5 and further equalized in the output equalizer 7 until they are passed on to the following transmission cable by way of the output 9.

A long distance current supply path extends from the input 1 to the output 9 by way of the dividing network 4, the low pass filter 10, the voltage drop element 11, the low pass filter 12 and the second dividing (or combining) network 6. The direct voltage obtained at the element 11 serves for an operating current supply of the amplifier or regenerator 5. During this process, the low pass filters 10 and 12 block the transmission of high frequencies over the long distance current supply path.

The overvoltage protection circuits 2 and 8 protect the line device from destruction by excessive voltages.

FIG. 2 illustrates the equivalent circuit of a known input and output equalizer. $Z_O$ is the wave resistance of the terminal lines and $Z_L$ is the wave resistance of the line section which has the form of a short circuited stub line of the length L.

FIG. 3 illustrates an embodiment of an equivalent circuit of the input equalizer 3, and of the output equalizer 7, according to the invention. This circuit is distinguished from the circuit of FIG. 2 in that the line section of a total length L is divided into two subsections each having a length L/2. One of the sub-sections has a wave resistance $Z_{L1}$ and the other sub-section has a wave resistance $Z_{L2}$. The sub-sections are connected in series and the transmission losses of the line section are considered in the terminating resistance $R_a$.

In comparison with the equivalent circuit according to FIG. 3 and in the case of the same overall length L, the difference wave resistances make possible a doubling of the band width if $Z_{L1} << Z_{L2}$, whereby the band width is arranged between zero and the frequency at which λ/4 resonance occurs on the line section. Between the extreme case of $Z_{L1} << Z_{L2}$ and the case of a homogeneous line with $Z_{L1} = Z_{L2}$, the band width of the equalizer can be continuously changed by varying the relation $Z_{L1}/Z_{L2}$.

FIG. 4 illustrates the attenuation for a series connection of equalizer--cable--equalizer. As an example for the cable, a coaxial cable having an inner diameter of 2.6 mm and an outer diameter of 9.5 mm having a length of 0.775 km was utilized. In the case of the curve a, the equalizer comprised a short circuited line section according to FIG. 2, and in the case of the curve b, a line section according to FIG. 3 is illustrated. The curve c illustrates the course of cable attenuation. A normalized frequency $x = f/f_T$ is shown on the abscissa, where $f$ is the frequency and $f_T = 500$ MHz.

Figure 5:
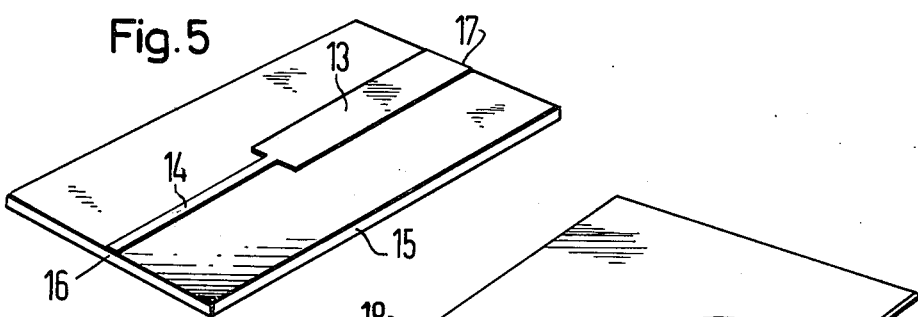
FIG. 5 is an isometric view of an exemplary embodiment of the inner conductor of a line section constructed in accordance with the invention.

Referring to FIG. 5, a practical embodiment of the inner conductor of a line section according to the invention is illustrated as having a length L according to FIG. 3. The inner conductor 13, 14 is arranged on a carrier, such as a glass fiber plate, in the form of a printed circuit.

The section 13 of the inner conductor serves for the realization of the wave resistance $Z_{L1}$, and the inner conductor 14, together with the outer conductor (not shown) serves for the realization of the wave resistance $Z_{L2}$. The inner conductor includes an input 16 and an output 17.

Figure 6:
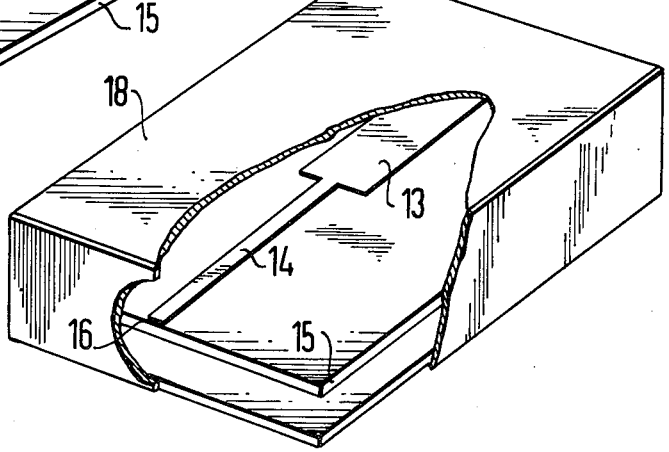
FIG. 6 is an oblique, partially sectioned view of a line section employing the structure of FIG. 5 within an outer conductor housing.

FIG. 6 illustrates the arrangement of the printed circuit according to FIG. 5 as the same is located in a housing 18 which serves as an outer conductor for the device.

Figure 7:
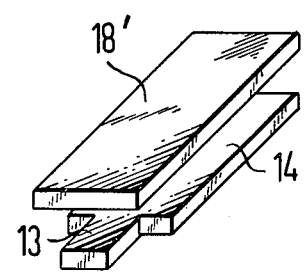
FIG. 7 is a schematic illustration of a line section in the form of a two-layer printed circuit, only the metal layers being shown.
Figure 8:
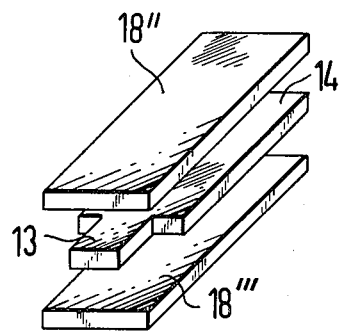
FIG. 8 is a schematic illustration of a line section in the form of a three layer printed circuit, only the metal layers being shown.

FIG. 7 schematically illustrates a line section in the form of a two layer printed circuit. For purpose of simplicity, only the metal layers have been shown. Similarly, FIG. 8 schematically illustrates a line section in the form of a three layer printed circuit. Again, for simplicity only the metal layers have been illustrated and the references 18' and 18'' indicate the metal housing as set forth above with respect to FIG. 6.

Figure 9:
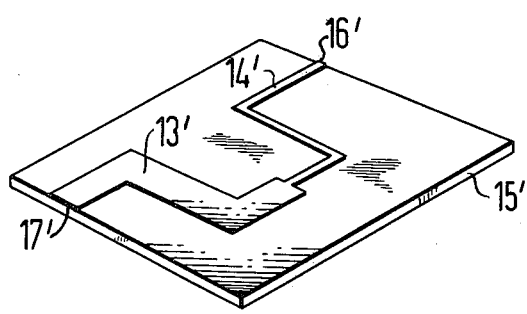
FIGS. 9 and 10 are illustrations of inner conductors in the form of printed circuits which have the form of meander or spiral configurations in order to save space.
Figure 10:
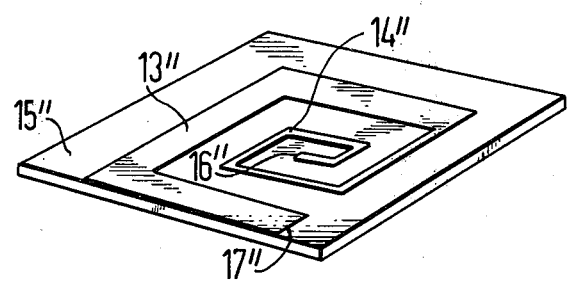

FIGS. 9 and 10 illustrate inner conductors in the form of printed circuits which have meander or spiral configurations in order to save space.

Figure 11:
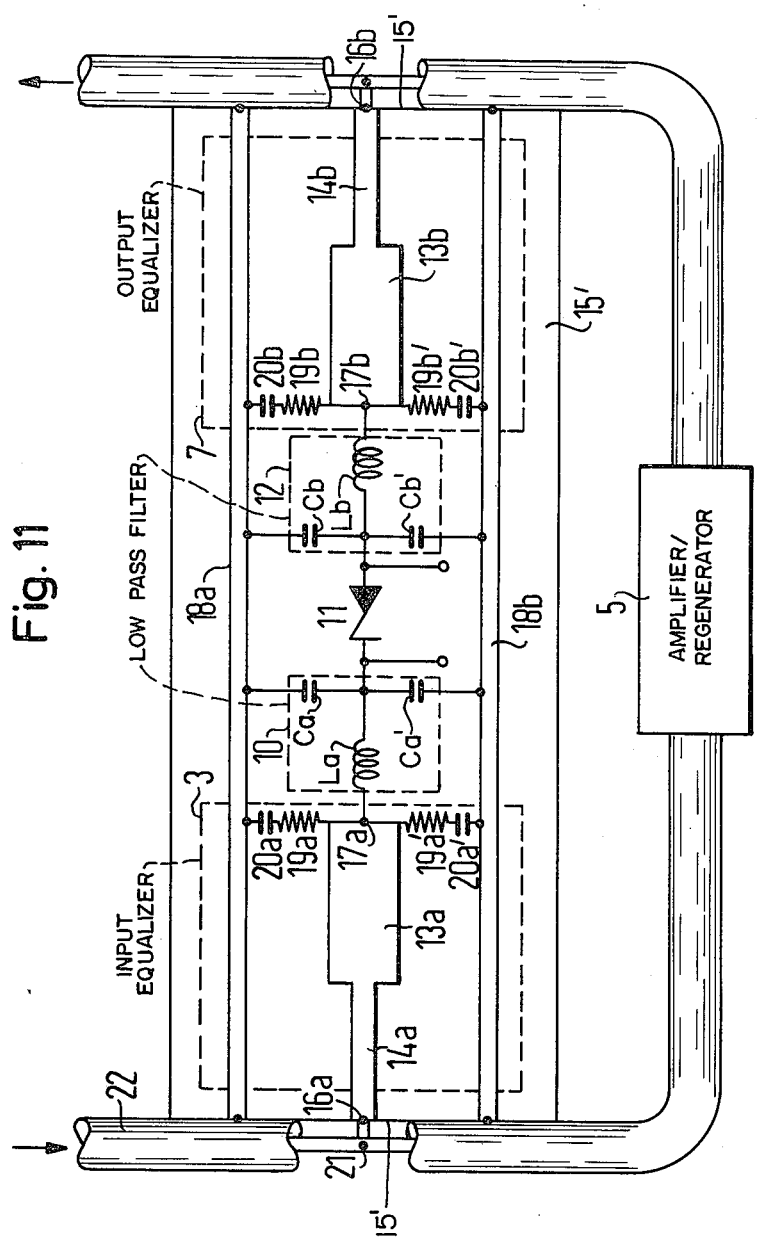
FIG. 11 is a schematic representation of an exemplary embodiment of an entire line device constructed in accordance with the invention.

Referring to FIG. 11, an exemplary embodiment of an entire line device is illustrated. The device comprises a carrier plate 15' having an input equalizer 3, a first low pass filter 10, a Lener diode voltage drop element 11, a second low pass filter 12 and an output equalizer 7.

The input equalizer 3 comprises the inner conductor 13a and 14a, the outer cnductors 18a and 18b and the terminating resistances 19a, 19a' which may likewise be constructed in accordance with printed circuit techniques. Furthermore, capacitors 20a, 20a' are provided which take on the function of the dividing network 4.

The output equalizer is constructed corresponding to the input equalizer 3. The low pass filters 10 and 12, as well as the voltage drop element 11, may also be constructed in accordance with integrated techniques. As illustrated on the drawing, the filter 10 includes a coil La and a pair of capacitors Ca, Ca', while the filter 12 includes a coil Lb and a pair of capacitors Cb, Cb'.

Instead of the outer conductors 18a and 18b, a housing which corresponds to the arrangement in FIG. 6, possibly including the aforementioned separating walls, may be provided.

The communications transmission path proceeds over a cable comprising an inner conductor 21 and an outer conductor 22, and over an amplifier or a regenerator 5. The input equalizer 3 is connected with the inner conductor 21 of the coaxial cable at the point 16a, and the input of the output equalizer 7 is connected with the inner conductor 21 at the point 16b. The outer conductor 22 of the cable is connected with the outer conductors 18a and 18b of the line sections, or to the housing when the same is used in place of the outer conductors 18a and 18b.

Figure 12:
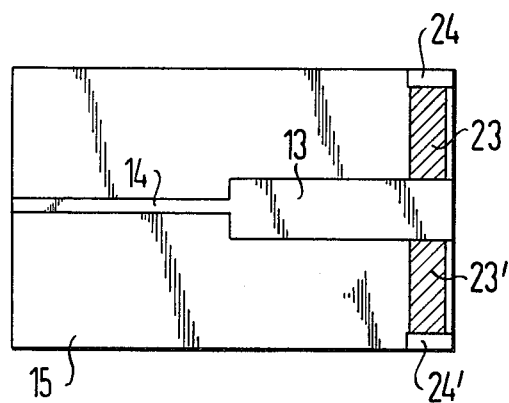
FIG. 12 is a plan view of the printed circuit shown in FIG. 5 additionally showing voltage dependent terminating resistances and terminating contacts.

FIG. 12 illustrates a printed circuit according to FIG. 5 which carries voltage dependent terminating resistances 23 and 23' and terminating contacts 24 and 24' for the connection of the outer conductor or the capacitors.

Figure 13:
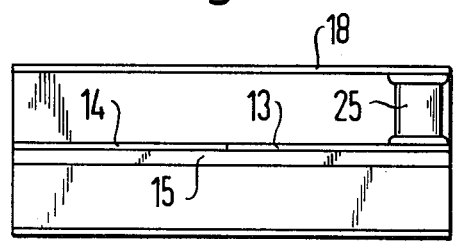
FIG. 13 is a sectional view of the apparatus of FIG. 6 also illustrating a gas-filled voltage arrester between the inner and outer conductors.

FIG. 13 illustrates a lateral view of the arrangement according to FIG. 6 in which a gas-filled voltage arrester 25 is provided between the inner conductor 13 and the outer conductor 18.

The adjustment of the line section, for example by reducing the width of the inner conductor section 13a, may be carried out by removing portions of the conductor section, as by sandblasting or the use of a laser beam.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A line for transmission paths having coaxial cables for the transmission of digital signals, comprising:
   an input equalizer, in the form of a line section, connected to the transmission path;
   a first circuit means connected to said input equalizer and dividing the transmission path into a communications transmission path and a long distance current supply path;
   a regenerator in said communications transmission path;
   a series circuit in said long distance current supply path, said series circuit including a first low pass filter, an element producing a voltage drop for the current supply of said regenerator and a second low pass filter;
   a second circuit means rejoining said communications transmission path and said long distance current supply path; and
   an output equalizer, in the form of a line section, connecting said second circuit means to said transmission path, each of said line sections including at least two sub-sections having different wave resistances and at least one of said sub-sections having a preset wave resistance, and a terminating resistance for each of said line sections.

2. The line device of claim 1, wherein said first and second circuit means each comprise at least one capacitor connected in parallel with a respective one of said terminating resistances.

3. The line device of claim 1, wherein each terminating resistance comprises a resistance layer carried on a substrate.

4. The line device of claim 1, wherein each said terminating resistance is constructed in the form of a chip.

5. The line device of claim 1, wherein each of said line sections includes input terminals adapted to be soldered to coaxial cables.

6. The line device of claim 1, wherein each of said line sections comprises at least one outer conductor and an inner conductor, and wherein said inner conductors form parts of and are included in said long distance current supply path.

7. The line device of claim 1, comprising a gas filled voltage arrester connected in parallel with a terminating resistance.

8. The line device of claim 1, wherein said terminating resistances each comprise a voltage dependent resistance for over-voltage protection.

9. The line device of claim 1, wherein said first and second circuit means each comprise at least one capacitor connected in series with a respective one of said terminating resistances.

10. The line device according to claim 9, comprising a gas filled voltage arrester connected in parallel with a series connection of said capacitor and the respective terminating resistance.

11. The line device of claim 1, comprising a substrate, each of said line sections including an inner conductor carried on said substrate and at least one common outer conductor for said inner conductors, said first low pass filter, said voltage drop element and said second low pass filter connected between said inner conductors and located within said outer conductor.

12. The line device of claim 11, wherein said outer conductor is in the form of a housing including shields between the line sections and their respective terminating resistances and low pass filters.

13. The line device of claim 1, wherein each of said line sections comprises a substrate, an inner conductor carried on said substrate, and an outer conductor disposed on both sides of said inner conductor.

14. The line device of claim 13, wherein said outer conductor comprises a housing surrounding said inner conductor.

15. The line device of claim 13, wherein said inner conductor extends along a path which is longer than the straight line distance between its ends to make its straight line length shorter than its electrical length.

16. The line device of claim 13, wherein said line sections comprises a multilayer printed circuit structure.

17. The device of claim 1, wherein each of said line sections comprises a single layer technique structure including a substrate, an inner conductor carried on one surface of said substrate and a pair of outer conductors carried on said one surface spaced from and on opposite sides of said inner conductor.

18. The device of claim 17, wherein said inner conductor of each of said line sections extends along a nonlinear path.

19. The device according to claim 17, wherein said terminating resistance of each of said line circuits comprises a printed resistance.

20. The device according to claim 17, wherein said terminating resistance of each of said line circuits comprises a thin film resistance.

21. The device according to claim 17, wherein said terminating resistance of each of said line circuits comprises a thick film resistance.

22. The device according to claim 1, wherein each of said line sections comprises a conductive housing serving as an outer conductor, a substrate within said housing and an inner conductor carried on said substrate.

23. The device according to claim 22, wherein said inner conductor of each of said line sections extends along a nonlinear path.

24. The device according to claim 22, wherein said terminating resistance of each of said line sections is a printed circuit resistance.

25. The device according to claim 22, wherein said terminating resistance of each of said line sections is a thin film resistance.

26. The device according to claim 22, wherein said terminating resistance of each of said line sections is a thick film resistance.

27. A line device for transmission of analog signals over a transmission path having coaxial cables, comprising:

an input equalizer, in the form of a line section, connected to the transmission path;
a first circuit means connected to said input equalizer and dividing the transmission path into a communications transmission path and a long distance current supply path;
an amplifier in said communications transmission path;
a series circuit in said long distance current supply path, said series circuit including a first low pass filter, an element producing a voltage drop for the current supply of said amplifier, and a second low pass filter;
a second circuit means rejoining said communications transmission path and said long distance current supply path; and
an output equalizer in the form of a line section, connecting said second circuit means to said transmission path, each of said line sections including at least two sub-sections having different wave resistances and at least one of said sub-sections having a preset wave resistance, and a terminating resistance for each of said line sections.

* * * * *